(12) United States Patent
Olsson et al.

(10) Patent No.: US 7,374,035 B2
(45) Date of Patent: May 20, 2008

(54) SUPPORTING INSTALLATION AND BEARING ELEMENT THEREFOR

(75) Inventors: Lennart Olsson, Nyhamnsläge (SE); Jonny Malmberg, Helsingborg (SE)

(73) Assignee: Frigoscandia Equipment AB, Helsingborg (SE)

( * ) Notice: Subject to any disclaimer, the term of this patent is extended or adjusted under 35 U.S.C. 154(b) by 5 days.

(21) Appl. No.: 10/535,721

(22) PCT Filed: Nov. 7, 2003

(86) PCT No.: PCT/SE03/01698

§ 371 (c)(1),
(2), (4) Date: Jan. 6, 2006

(87) PCT Pub. No.: WO2004/045994

PCT Pub. Date: Jun. 3, 2004

(65) Prior Publication Data

US 2006/0185964 A1    Aug. 24, 2006

(30) Foreign Application Priority Data

Nov. 20, 2002   (SE)   .................................. 0203419

(51) Int. Cl.
*B65G 13/02*   (2006.01)
(52) U.S. Cl. ...................................... 198/778; 198/779
(58) Field of Classification Search ............... 198/778, 198/779
See application file for complete search history.

(56) References Cited

U.S. PATENT DOCUMENTS

| | | | |
|---|---|---|---|
| 2,908,069 A | | 10/1959 | Richardson et al. |
| 3,854,575 A | | 12/1974 | Fraioli, Sr. |
| 4,565,282 A | * | 1/1986 | Olsson et al. ................ 198/778 |
| 4,850,475 A | * | 7/1989 | Lupo et al. .................. 198/778 |
| 4,899,871 A | | 2/1990 | Olsson |
| 5,458,228 A | * | 10/1995 | Olsson ........................ 198/778 |
| 5,460,260 A | | 10/1995 | Ochs et al. |
| 6,523,677 B1 | * | 2/2003 | DeGennaro et al. ......... 198/778 |
| 6,578,704 B1 | * | 6/2003 | MacLachlan ................ 198/778 |

FOREIGN PATENT DOCUMENTS

| | | |
|---|---|---|
| AU | 469393 A | 6/1973 |
| GB | 1165061 | 9/1969 |
| SU | 542692 | 1/1977 |
| SU | 1336947 A3 | 9/1987 |

* cited by examiner

*Primary Examiner*—James R Bidwell
(74) *Attorney, Agent, or Firm*—Christensen O'Connor Johnson Kindness PLLC (57) ABSTRACT

A supporting installation (1) for supporting a number of turns, extending helically one upon the other in a stack, of an at least partly self-supporting conveyor belt (2) comprises at least one bearing element (9) for supporting the conveyor belt (2), and a section (4) for supporting the bearing element (9). The section (4) is extended in an endless loop along which the bearing element (9) is movable. At least one bearing element (9) is a roller bearing element (10).

29 Claims, 7 Drawing Sheets

SUPPORTING INSTALLATION AND BEARING ELEMENT THEREFOR

FIELD OF THE INVENTION

The present invention relates generally to supporting installations and in particular to supporting installations which support a number of turns, extending helically one upon the other in a stack, of an at least partly self-supporting conveyor belt. The supporting installation comprises at least one bearing element for supporting the conveyor belt, and a section for supporting the bearing element, said section being extended in an endless loop along which the bearing element is movable.

BACKGROUND ART

Supporting installations of the above type are used, for instance, in the foodstuff industry for supporting conveyor belts in compact air treatment plants, in which products arranged on the helically travelling conveyor belt are exposed to a flow of air. The flow of air can be adapted, for instance, to freeze or heat the product.

Air treatment plants of this type thus comprise a conveyor belt and a supporting installation. The conveyor belt is arranged in a helical path, the supporting installation being adapted to support the lowermost turn of the conveyor belt. In the contact surfaces between the conveyor belt and the supporting installation, relatively great, radially inwardly directed and vertically downwardly directed forces are applied, which cause frictional forces.

To reduce the frictional forces between the conveyor belt and the supporting installation it is known to arrange a slide bearing on the supporting installation, said slide bearing being capable of reducing the frictional forces caused by the vertical forces.

The drawbacks of such a solution are that it does not satisfactorily solve the problem with friction since relatively high frictional forces are still generated. Furthermore, this known solution is not capable of solving the problems that exist with regard to frictional forces caused by the radially inwardly directed forces which the conveyor belt exerts on the supporting installation.

SE 454,728 discloses a supporting installation, in which a bearing element containing balls is arranged between the conveyor belt and a section. The supporting installation comprises a chain on which the conveyor belt rests. The chain rests in turn on said balls, which thus are arranged in a channel defined by said chain together with the section, which forms a ball race. The balls act as a ball bearing between the conveyor belt and the section. Supporting installations comprising bearing elements in the form of balls are also known from U.S. Pat. No. 4,899,871 and U.S. Pat. No. 5,458,228.

There may in some cases be a need for supporting installations which have a higher capacity with regard to operating speed as well as load than the above-mentioned type of supporting installation with bearing elements in the form of balls.

U.S. Pat. No. 3,006,456 discloses a suspension device comprising a number of first and second pairs of wheels which are alternately arranged and connected to each other. The device is adapted to run in a square tube with a longitudinal slot. The first pairs of wheels each have an axle which via a link is adapted to be connected to an element that is to be suspended. The second pairs of wheels are perpendicularly arranged in relation to the first pairs of wheels.

It should be noted that the first and second pairs of wheels do not act as a bearing element.

A bearing element acts as a bearing between two parts, the bearing element being able to move independently of said parts.

There is thus a need for an improved supporting installation for supporting a helically travelling conveyor belt, said supporting installation having a higher capacity as regards operating speed and load.

SUMMARY OF THE INVENTION

In view of what has been stated above, an object of the present invention is to provide an improved supporting installation of the type described by way of introduction.

A special object of the invention is to provide a supporting installation with a higher capacity with regard to operating speed.

A further object is to provide a supporting installation with a higher capacity with regard to load.

The supporting installation preferably comprises a bearing element which has a long life.

It is also preferred for the supporting installation to be easy to manufacture, mount and maintain.

It is also an object of the present invention to provide an improved bearing element for a supporting installation.

According to a first aspect of the invention, a supporting installation is thus provided for supporting a number of turns, extending helically one upon the other in a stack, of an at least partly self-supporting conveyor belt comprising at least one bearing element for supporting the conveyor belt, and a section for supporting the bearing element, said section being extended in an endless loop along which the bearing element is movable. The supporting installation is characterised in that the at least one bearing element is a roller bearing element comprising a plurality of first and second roller means.

This results in an improved supporting installation. Owing to the bearing element and the cooperation thereof with a supporting section, the supporting installation is capable of being exposed to relatively high loads while nevertheless the bearing element can be made to have a long life. Consequently, the inventive supporting installation can be made to have a load capacity which is higher than in conventional supporting installations.

A special advantage of this aspect of the inventive supporting installation is that the force transmission from the conveyor belt to the section occurs via the bearing element in the form of a roller bearing element, whereby the transmission of force is effected by line contact with the bearing element. The design of the bearing element thus makes it possible to reduce frictional forces while at the same time overloading of the bearing element can be prevented owing to said line contact.

Moreover it is an advantage of the inventive supporting installation that it can be given a higher capacity with regard to operating speed. This is due to the fact that the inventive supporting installation comprises a bearing element in the form of a roller bearing element with a plurality of first and second roller means. This makes it possible to design the bearing element as an integral unit, which is to be compared with conventional supporting installations with a bearing element in the form of balls which each form a separate unit. The conceivable operating speed of a bearing element is a function of the frictional forces in the bearing element and the wear on the same. By designing the bearing element as an integral unit, the frictional forces and, thus, the wear on the moving parts of the supporting installations will be reduced, thus allowing operation at a higher speed.

Another advantage of the inventive supporting installation is that the section can be designed and mounted in a simple way since the section can be given a simple shape and need not form, for instance, a rounded ball race.

The first roller means preferably have axes which are oriented in the transverse direction of the section. This means that the first roller means can act to receive either radial or vertical forces from the conveyor belt.

The second roller means preferably have axes which are oriented perpendicular both to the axes of the first roller means and to the longitudinal direction of the section. This implies that the second roller means can act to receive either radial or vertical forces. More specifically the second roller means act to receive radial forces if the first roller means act to receive vertical forces and vice versa. In this way, a supporting installation is provided, in which force transmission between the conveyor belt and the section occurs via the first and second roller means of the bearing element which act to reduce frictional forces and which, owing to said line contact, have a long life.

According to a preferred embodiment of the inventive supporting installation, the first and second roller means of the bearing element are alternately arranged in the longitudinal direction of the bearing element. Owing to such orientation, the force transmission between the conveyor belt and the section will be uniform both in the radial and in the vertical direction.

According to another preferred embodiment, the roller means are spaced from each other. The arrangement of the roller means spaced from each other ensures that they cannot engage with each other. As a result, unnecessary frictional resistance between the roller means is prevented, while at the same time the wear on the roller means is reduced.

According to yet another preferred embodiment, neighbouring roller means are connected with each other to form a bearing element extended continuously in its longitudinal direction. A thus designed bearing element is easy to mount. At the same time it will be easy to achieve the above-mentioned separation of the roller means. The separation can be achieved, for instance, by ensuring that the connection which connects the roller means also acts to keep them apart.

The interconnected roller means can be arranged to form an endless bearing element. The advantage of arranging the bearing element in an endless form is that all roller means can be arranged equidistantly spaced from each other while avoiding problems at the ends of the bearing element.

The diameter of the ones of the first and second roller means is preferably greater than the width of the others of the first and second roller means.

The geometric centre of the ones of the first and second roller means is preferably arranged essentially along the rotational axis of the others of the first and second roller means, seen perpendicular to a plane made up by two mutually orthogonal axes which are perpendicular to the longitudinal direction of the bearing element. This is favourable since it is thus ensured that only the circumferential surfaces of the roller means, which constitute the actual bearing surfaces, make contact with the section and the conveyor belt. The fact that only the circumferential surfaces of the roller means are in contact with the section and the conveyor belt results in the friction being reduced.

The roller means of the bearing element are preferably relatively movable in the longitudinal direction of the section. Said roller means can be relatively movable under spring action. The mobility, and above all when this mobility occurs under spring action, implies that a separate tensioning means need not be arranged adjacent the bearing element for stretching the same.

According to another preferred embodiment, the supporting installation comprises at least one drive means which is drivable by a motor and adapted to drive the conveyor belt. The drive means preferably consists of a chain.

According to yet another preferred embodiment, the supporting installation comprises a carrier means which is extended along said section and adapted to support the conveyor belt, said bearing element being arranged between said carrier means and said section. The carrier means preferably consists of a chain.

It is preferred for the carrier means to be formed by the drive means.

The supporting installation may comprise two chains each extended along a section and adapted to drive and support the belt at a longitudinal side edge each of the belt, wherein a bearing element in the form of a roller bearing element is arranged between the associated chain and section.

According to yet another preferred embodiment of the inventive supporting installation, the section comprises a bearing seat extended along the section and being L shaped in cross-section and adapted to receive said bearing element. As a result, the section can be manufactured in a simple manner since it has an uncomplicated cross-section. Moreover, mounting of the section will be extremely simple.

According to a second aspect of the invention, a bearing element for a supporting installation is also provided. The bearing element is characterised by first roller means and second roller means, which are alternately arranged in succession to form an elongate bearing element, the rotational axes of the first and second roller means being mutually orthogonal and also perpendicular to the longitudinal direction of the bearing element, and two neighbouring roller means being interconnected by means of a connecting element which holds said neighbouring roller means spaced from each other and which allows relative mobility between the roller means in the longitudinal direction of the bearing element.

This results in a bearing element, in which the first and second roller means included therein are connected to each other as well as relatively movable. A thus designed bearing element will act for force transmission by line contact, which makes it possible for the bearing element to have an advantageously long life. Furthermore, the orientation of the first and second roller means implies that the bearing element can act as a bearing in two orthogonal directions and thus act to receive both vertical and radial forces. By the roller means being separated, it is ensured that they cannot make contact with each other and thus cause unfavourable loss due to friction.

The diameter of the ones of the first and second roller means can preferably be greater than the width of the others of the first and second roller means.

The mobility between the roller means can be provided by means of elongate holes which are formed in the respective connecting elements and extend in the longitudinal direction of the bearing element and which encompass a web of one of two neighbouring roller means. The elongate holes make it possible to provide mobility in a simple and advantageous manner.

Each connecting element can be arranged so as to allow mutual resilience of the roller means. The mutual resilience of neighbouring roller means eliminates the need for tensioning means for taking up a slack in the bearing element.

Each roller means can preferably comprise a web. This makes it possible to connect the roller means to each other in a simple way.

According to a preferred embodiment, the connecting element comprises a U-shaped piece with a hole formed in each leg of the U-shaped piece, which holes are aligned with each other, the web of the U-shaped piece grasping a web of one of the first and the second roller means and said holes receiving a web of the other of the first and the second roller means.

A resilient lip can be arranged on the edge of the hole in one of the legs of the U-shaped piece, said lip being extended towards the hole in the other of the legs of the U-shaped piece. This makes it possible to achieve the resilience between the roller means in a simple way.

BRIEF DESCRIPTION OF THE DRAWINGS

Preferred embodiments of the present invention will now be described by way of example and with reference to the accompanying drawings.

Components with an equivalent function have been given the same reference numerals throughout the text.

DESCRIPTION OF A PREFERRED EMBODIMENT

Figure 1:
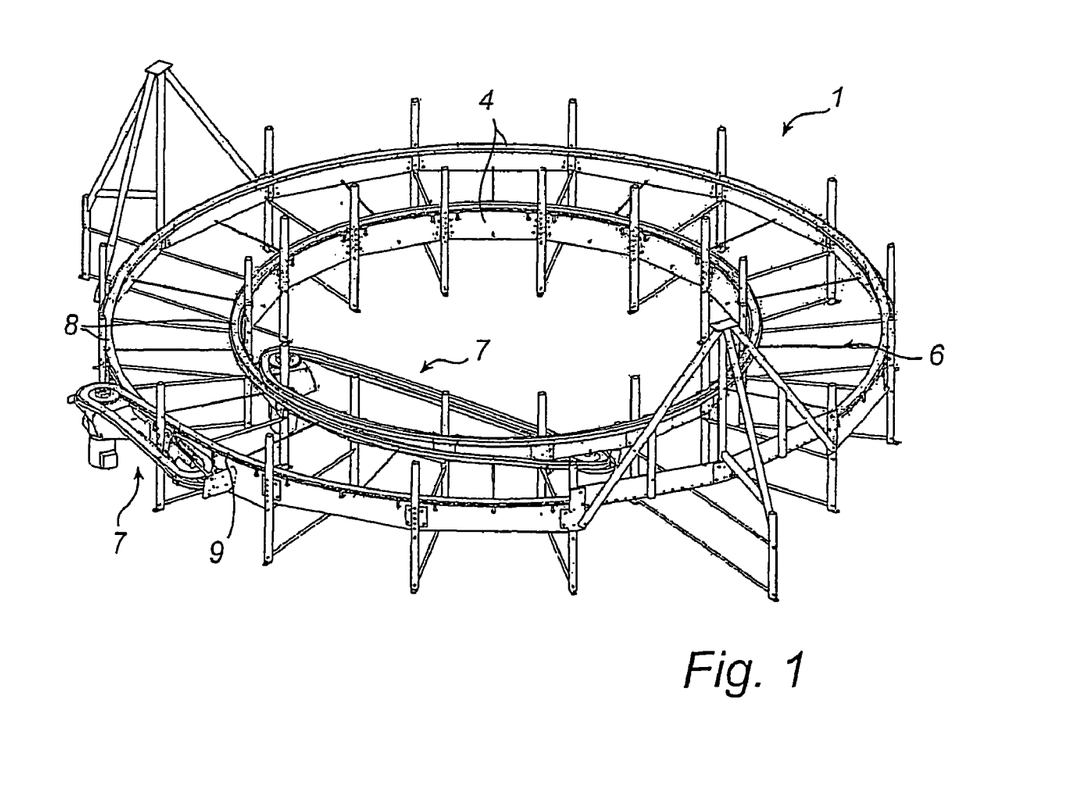
FIG. 1 is a perspective view of a supporting installation.
Figure 2:
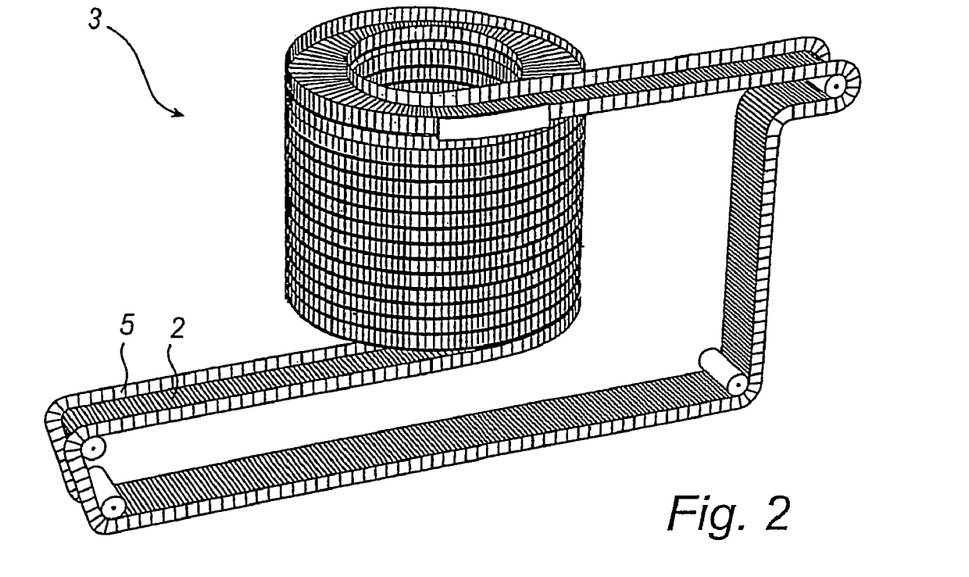
FIG. 2 is a perspective view of a belt stack.

FIG. 1 illustrates a preferred embodiment of a supporting installation 1 according to the present invention for supporting an endless conveyor belt 2 travelling helically as shown in FIG. 2, below referred to as a belt stack 3.

The supporting installation 1 in combination with the conveyor belt 2 is advantageously used in air treatment plants, such as a refrigerating plant. The supporting installation 1 and the belt stack 3 are arranged in a surrounding casing through which cold air flows.

The sequence of operations in a refrigerating plant can, for instance, be such that a food product is placed on the conveyor belt. Then the product is conducted into the casing through an inlet and refrigerated by means of the cold air while being conveyed along the helical path of the conveyor belt 2 in the casing. As the food product leaves the casing, it is removed from the conveyor belt 2 which along a return path is returned to the inlet of the casing.

The supporting installation 1 is adapted to support the belt stack 3 by supporting the lowermost turn of the helical conveyor belt 2. The supporting installation 1 is also adapted to raise the lowermost turn to allow introduction of a new lowermost turn of the belt stack 3.

In the shown embodiment, the supporting installation 1 is adapted to support the conveyor belt 2 along opposite side edges thereof. To this end, the supporting installation 1 comprises two sections 4, which are extended each along an endless path and which are adapted to support a side edge 5 each of the conveyor belt 2. Each section 4 comprises a conveyor belt supporting portion 6 and a return portion 7. The conveyor belt supporting portion 6 of each section 4 extends essentially along the side edge 5 of the lowermost turn of the conveyor belt 2, which side edge 5 the associated section 4 is adapted to support. Each section 4 forms a bearing seat 8 for receiving an elongate bearing element 9. The bearing elements 9 cooperate with the sections 4 to receive both vertical and radial forces which are exerted by the conveyor belt 2 on the supporting installation 1.

The supporting installation 1 can be adapted to support a wholly or partly self-supporting belt 2.

By a self-supporting belt 2 is meant that at least one side edge 5 of a superposed turn of the conveyor belt 2 is stacked along the distance it travels helically on an opposite side edge 5 of a subjacent turn of the conveyor belt 2.

The supporting installation 1 shown in FIG. 1 is intended for a completely self-supporting belt 2, shown in FIG. 2, that is to say a subjacent turn in the belt stack supports a superposed turn.

The conveyor belt supporting portion 6 of each section 4 has a pitch and thus assumes the shape of a helical turn. The belt stack 3 is thus formed when the opposite side edges 5 of the conveyor belt 2 run along the respective conveyor belt supporting portions 6 of the sections 4. In the shown embodiment, the conveyor belt supporting portions 6 are essentially circular, whereby the formed belt stack 3 obtains a circular cylindrical shape. However, it will be appreciated that the conveyor supporting portions 6 can have other shapes, for instance elliptic, whereby the formed belt stack 3 obtains an elliptic cylindrical shape.

The pitch of the conveyor belt supporting portions 6 is such as to correspond to the height of the conveyor belt 2. This means that when the lower turn of the conveyor belt 2 has made one turn along said conveyor supporting portions 6, this turn is stacked on a hew lowermost turn of the conveyor belt 2.

As mentioned above, each bearing element 9 cooperates with an associated section 4 for receiving the forces exerted by the conveyor belt 2 on the supporting installation 2 by transferring said forces to the section 4. The bearing element 9 is adapted to reduce the frictional forces generated.

Figure 3:
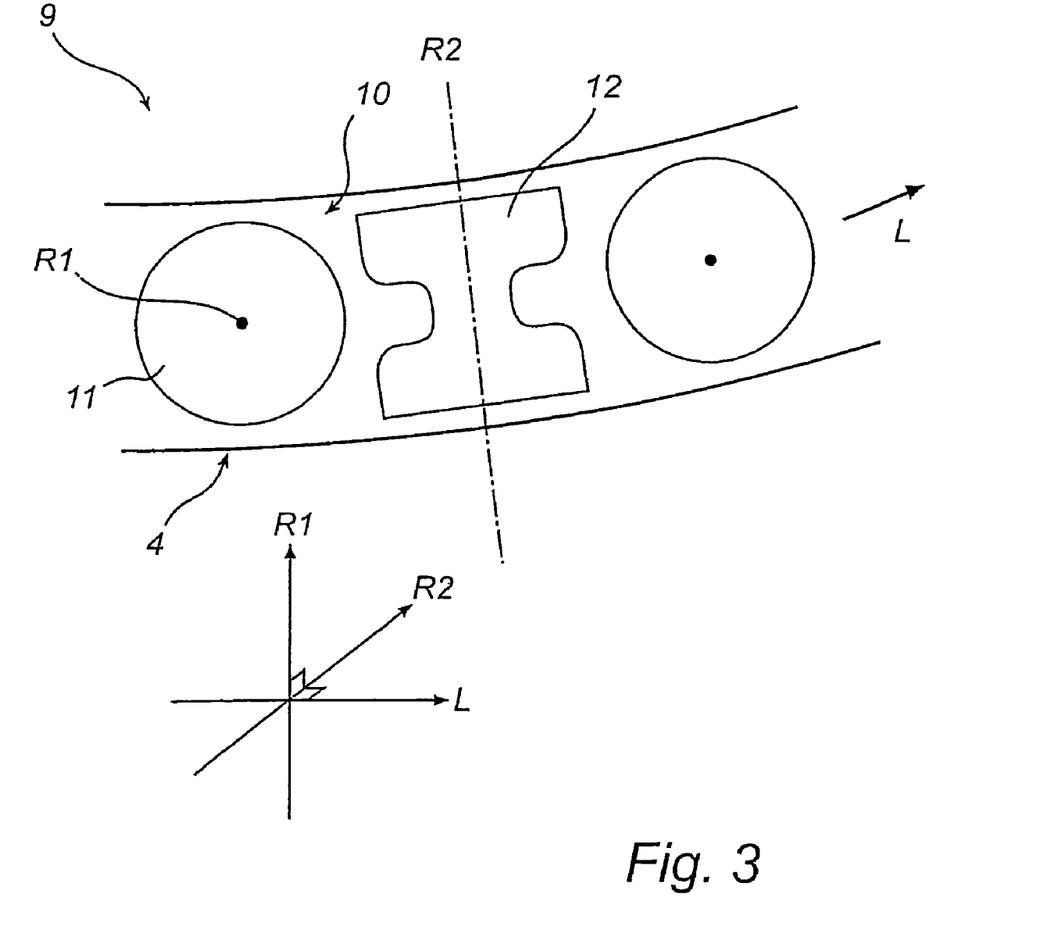
FIG. 3 is a schematic view of the roller means on the section.

A bearing element 9 is shown schematically in FIG. 3, to which reference is now made. The bearing element 9 is formed by a roller bearing element 10 which comprises a plurality of first and second roller means 11, 12. The first roller means 11 are arranged so that their rotational axes R1 are perpendicular to the longitudinal direction L of the section 4. The second roller means are arranged so that their rotational axes R2 are perpendicular both to the longitudinal direction L of the section and to the rotational axes R1 of the first roller means. With this orientation of the roller means 11, 12, the roller bearing element 10 can act as a roller bearing both in the radial and in the vertical direction.

The first and the second roller means 11, 12 are, in the shown embodiment, alternately arranged to allow an even force transmission between the associated section 4 and the conveyor belt 2. The roller means 10 are spaced from each other to prevent unnecessary frictional forces from being formed by mutual contact with each other.

A bearing element 9 can act in a supporting installation 1 without any lubricant being required since friction will be low.

Figure 4:
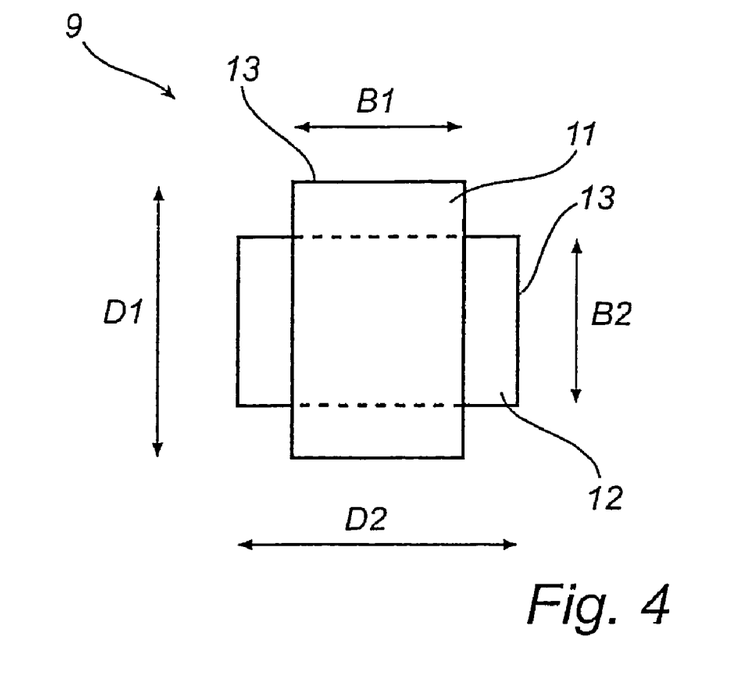
FIG. 4 is a schematic side view of a first and a second roller means.

The first roller means 11 have a diameter D1 which is greater than the width B2 of the second roller means 12 and vice versa, which is shown in FIG. 4. The roller means 11, 12 are mutually oriented so that only the circumferential surfaces 13 of the roller means 11, 12 come into contact with the section 4 and the conveyor belt 2. The force transmission from the conveyor belt 2 to the section 4 is thus effected by line contact with the roller means 11, 12 of the bearing element 9, which means that the bearing element 9 is subjected to an extended load which allows the bearing element 9 to have a long life.

Figure 5:
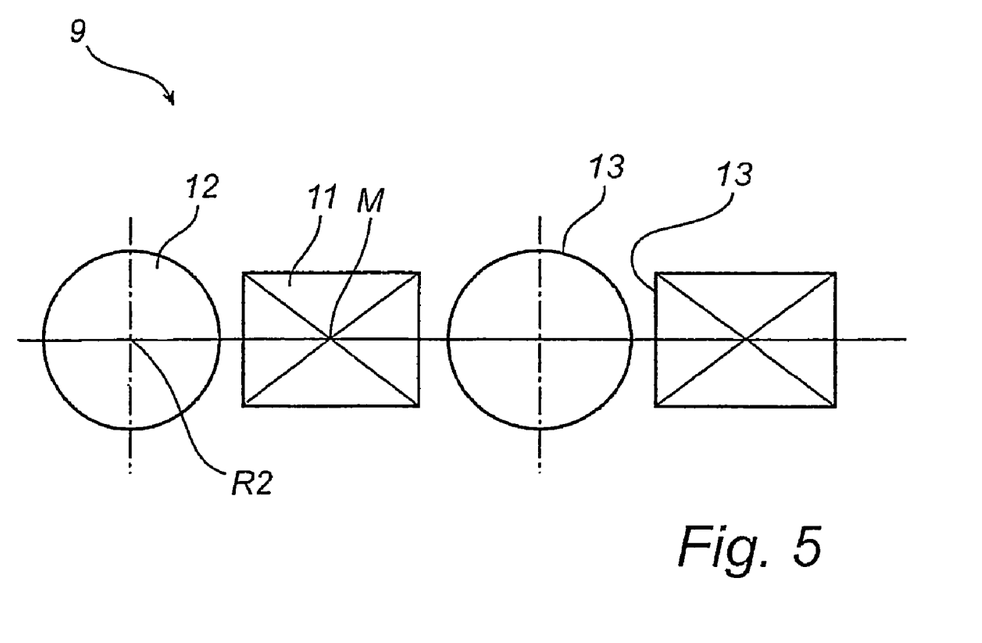
FIG. 5 is a schematic view of the relative orientation of the first and second roller means.

The orientation is achieved by the greatest width B1, B2 of a first roller means 11 being arranged within the greatest diameter D1, D2 of a subsequent, second roller means 12. If the roller means 11, 12 are essentially cylindrical, the centre M of one of two neighbouring roller means 11, 19 is arranged along the rotational axis R2 of the second roller means 12, seen in a plane perpendicular to the longitudinal direction of the section, which is shown in FIG. 5.

Figure 6:
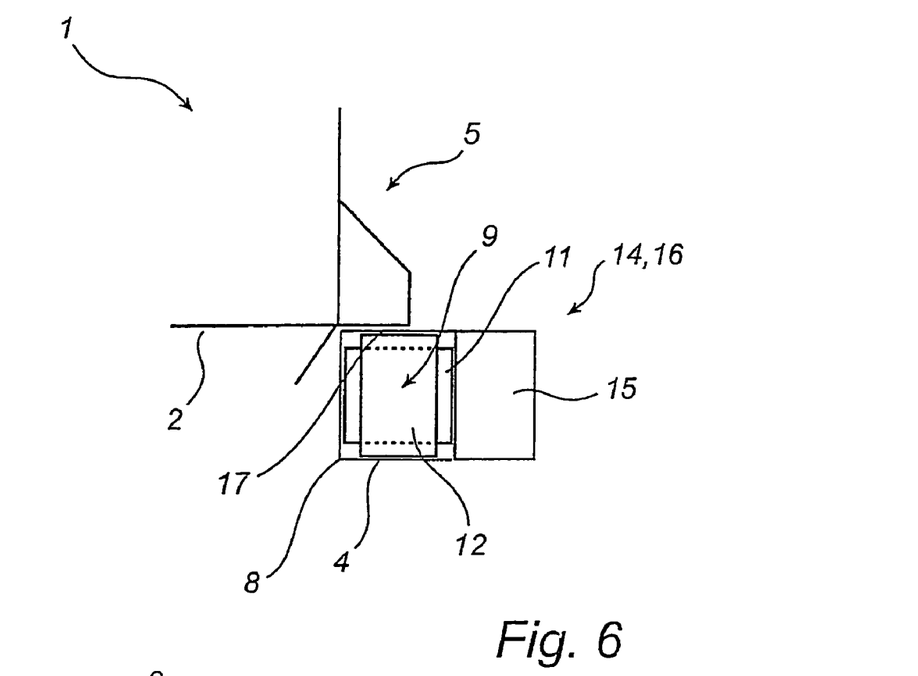
FIG. 6 is a schematic partial view in cross-section of the supporting installation shown in FIG. 1.

FIG. 6, to which reference is now made, is a cross-sectional view of part of a supporting installation 1 and a conveyor belt 2 arranged thereon. More specifically, the Figure is a cross-section illustrating how a side edge 5 of the lower turn of the conveyor belt 2 is supported by a section 4 of the supporting installation 1. The supporting installation 1 comprises, in addition to that described above with reference to FIG. 1, a drive means 14 in the form of a chain 15 for driving the conveyor belt 2. The chain 15 also acts as a carrier means 16 supporting the conveyor belt 2, the section 4 being adapted to support the chain 15 by means of the bearing element 9. The chain 15 is extended along said section 4 and is drivable by a motor which can be arranged along said return portion 7 of the section 4. A corresponding arrangement can be adapted to support the other side edge 5 of the conveyor belt 2.

The chain 15 is adapted to support the lowermost turn of the conveyor belt 2 along the conveyor belt supporting portion 6 of the section 4 and is thus arranged between the section 4 and the conveyor belt 2. Said bearing element 9 is arranged between the chain 15 and the section 4. The chain 15 has a relatively flat abutment surface 17 for the conveyor belt 2, which ensures an even force transmission.

The section 4 is L shaped in cross-section to form a bearing seat 8 which in a simple way can receive the vertically downwardly directed forces and the radially inwardly directed forces which are exerted on the supporting installation 1 when the conveyor belt 2 travels along the conveyor belt supporting portion 6 of the section 4.

The section 4 is easy to make and mount and also cooperates in a satisfactory manner with the first and second roller means 11, 12 of the bearing element 9.

According to the present invention, a supporting installation 2 for supporting a belt stack 3 is thus provided. The supporting installation 1 has a bearing element 9 in the form of a roller bearing element 10 with a plurality of first and second roller means 11, 12 for supporting the belt stack 3.

According to one embodiment, the bearing element 9 is arranged to support opposite longitudinal side edges 5 of the lowermost turn of the belt stack 3.

The inventive supporting installation 1 can be made to have high capacity both with regard to operating speed and with regard to load.

The higher capacity with regard to load has been discussed and thus is achieved by the fact that the bearing element 9 acts for force transmission by line contact.

The higher capacity with regard to speed is achieved by designing the bearing element 9 in the form of an integral unit, i.e. the roller means 11, 12 are interconnected to form an elongate bearing element 9. As a result, the number of relatively movable parts in the supporting installation 1 can be greatly reduced, which means that the frictional forces and thus the wear on the movable parts of the supporting installation are reduced, thus allowing operation at a higher operating speed.

Figure 7:
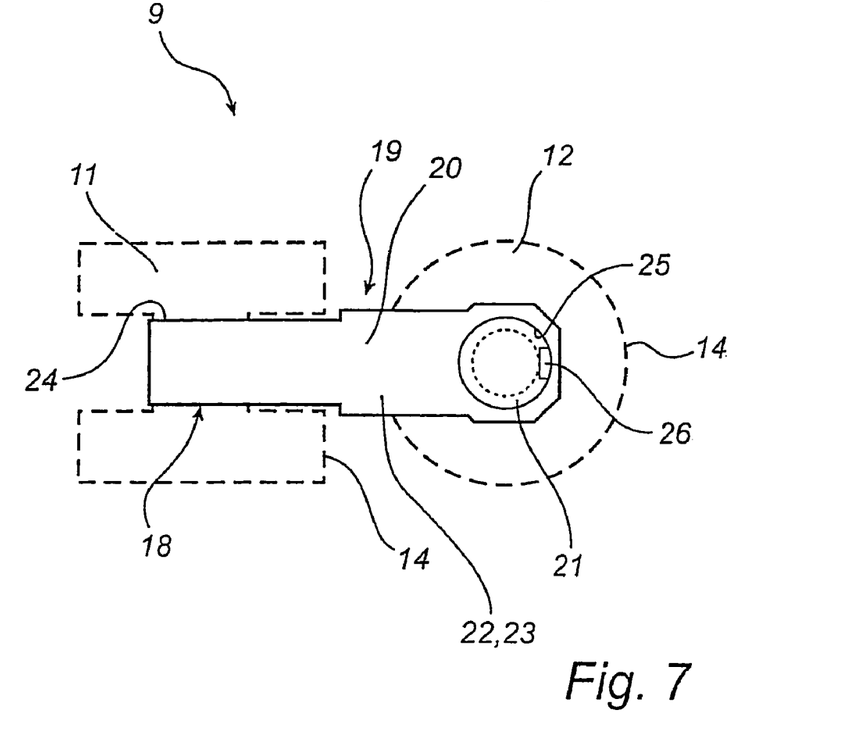
FIG. 7 is a top plan view of roller means and a first embodiment of a connecting element.

FIG. 7 shows the fundamental design of an embodiment of a bearing element 9. The roller means 11, 12 can be connected to each other. The roller means 11, 12 have a web 18 in order to be connected in a simple manner with neighbouring roller means 11, 12 by means of a connecting element 19. The connecting element 19 is adapted to connect as well as keep apart the various roller means 11, 12. This ensures that the circumferential surfaces 13 of the interconnected roller means 11, 12 do not come into contact with each other, and thus that no further friction occurs.

According to the embodiment of the connecting element 19 which is shown in FIG. 7, this consists of a U-shaped piece 20. The U-shaped piece 20 has a hole 21 formed in each leg 22, 23. The holes 21 are aligned with each other. The web 24 of the U-shaped piece 20 grasps the web 18 of one of the first and second roller means 11, 12. The holes 21 receive the web 18 of the other of the first and second roller means 11, 12. A flange 26 is positioned on the edge 25 of the hole. The flange 26 is inwardly bent and adapted to act resiliently against the web 18 of the roller means 11, 12 when stretching the bearing element 9. When two roller means 11, 12 are moved towards each other, two connecting elements 19 in succession will come into contact with each other and prevent contact between the circumferential surfaces of two roller means 11, 12. The connecting element 19 thus ensures that a connection between the roller means 11, 12 is provided, which connection both keeps the roller means 11, 12 apart and is resilient in the stretching of the bearing element 9. The resilience of the connecting element 19 eliminates the need for supplementary tensioning means for taking up a slack in the bearing element 9.

Figure 8:
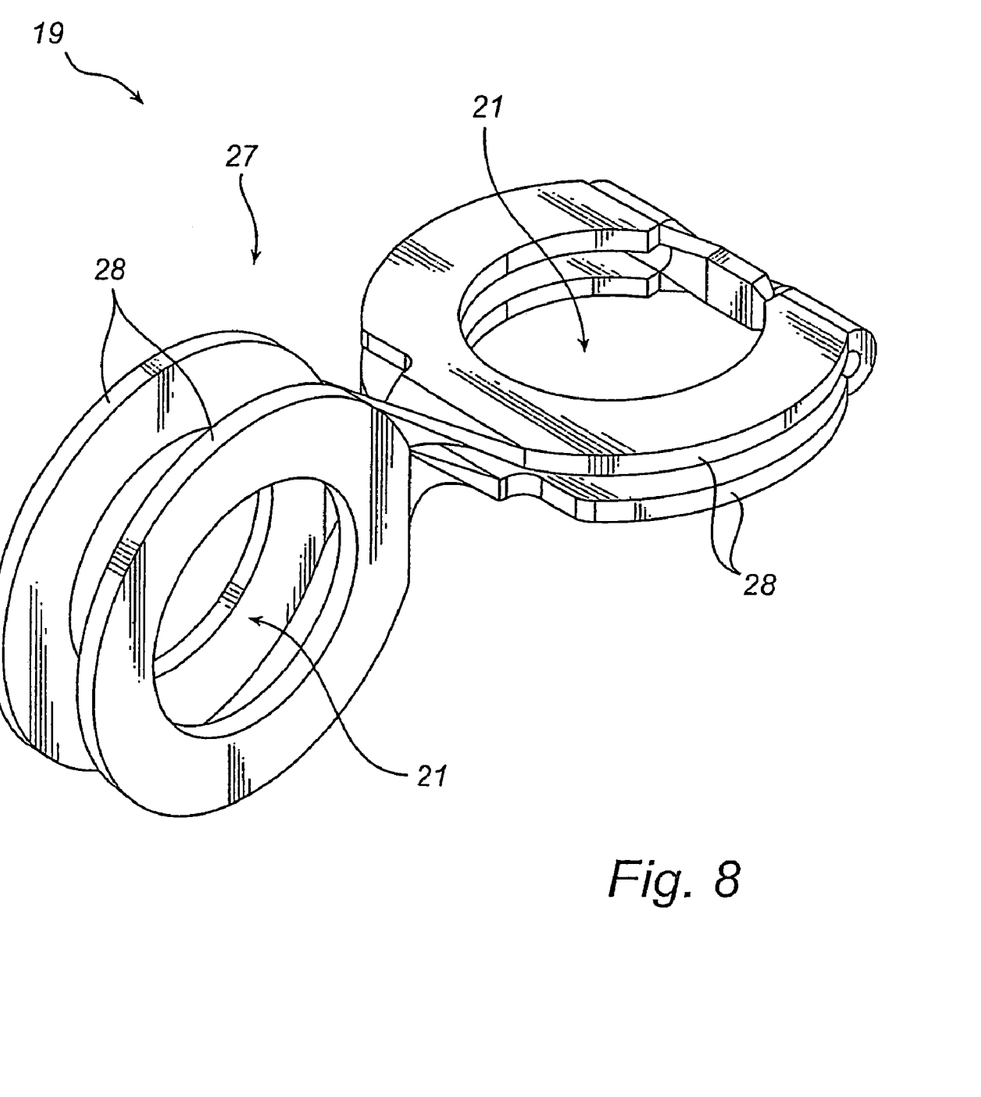
FIG. 8 is a top plan view of a second embodiment of a connecting element.

A second embodiment of a connecting element 19 is shown in FIG. 8. The connecting element 19 comprises a body 27, in which two roller means receiving holes 21 are formed. The holes 21 are mutually rotated through 90° and adapted to receive a web 18 of a first and a second roller means 11, 12. With the holes 21 mutually rotated in the manner shown, the roller means 11, 12 will thus be oriented with their rotational axes R1, R2 perpendicular to each other. The connecting element 19 is made of a metal sheet with four circular segments 28, a hole 21 being formed in each of the segments 28. The metal sheet is bent in the middle so that the holes 21 are arranged in pairs one above the other. Each pair of holes 21 forms one of the above-mentioned roller means receiving holes 21. By rotating the metal sheet, the mutual rotation of the roller means receiving holes is then performed. In this manner, a connecting element 19 is provided, which has the advantage of both connecting and separating the roller means 11, 12.

Figure 9:
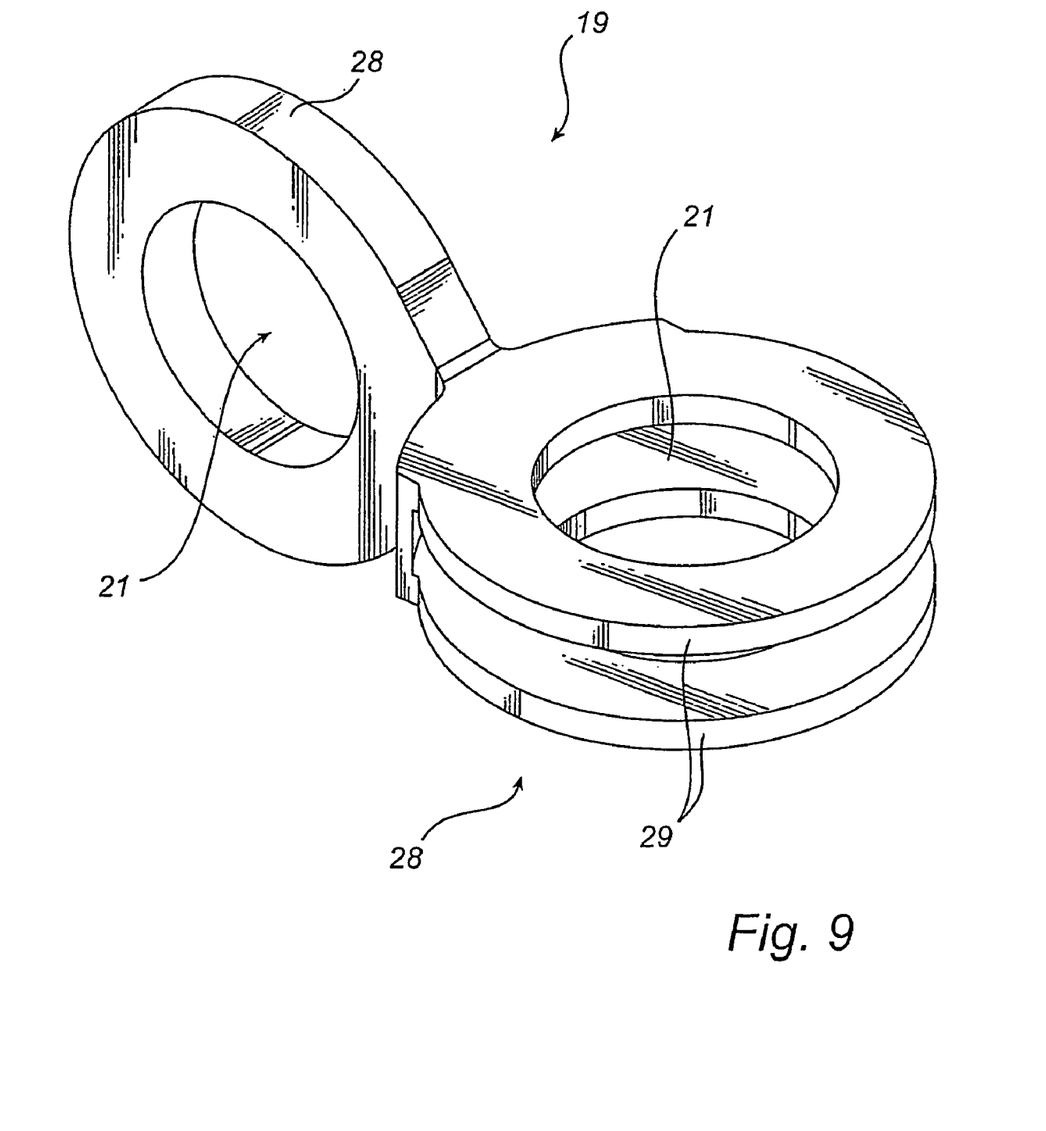
FIG. 9 is a top plan view of a third embodiment of a connecting element.

A third embodiment of a connecting element 19 is shown in FIG. 9, to which reference is now made. The embodiment has two mutually rotated circle segments 28 with roller means receiving holes 21, which are adapted to receive a web 18 of a first and a second roller means 11, 12. The connecting element 19 is in the form of an eight, where one circle segment 28 is perpendicularly rotated relative to the other circle segment 28. One of the circle segments 28 consists of two discs 29 which each have a roller means receiving hole 21, which holes are aligned with each other. The gap between the discs 29 is such that it can receive the other circle segment 28 of a subsequent connecting element 19. In this way, a connecting element 19 is provided, which reliably connects as well as separates the roller means 11, 12.

Figure 10:
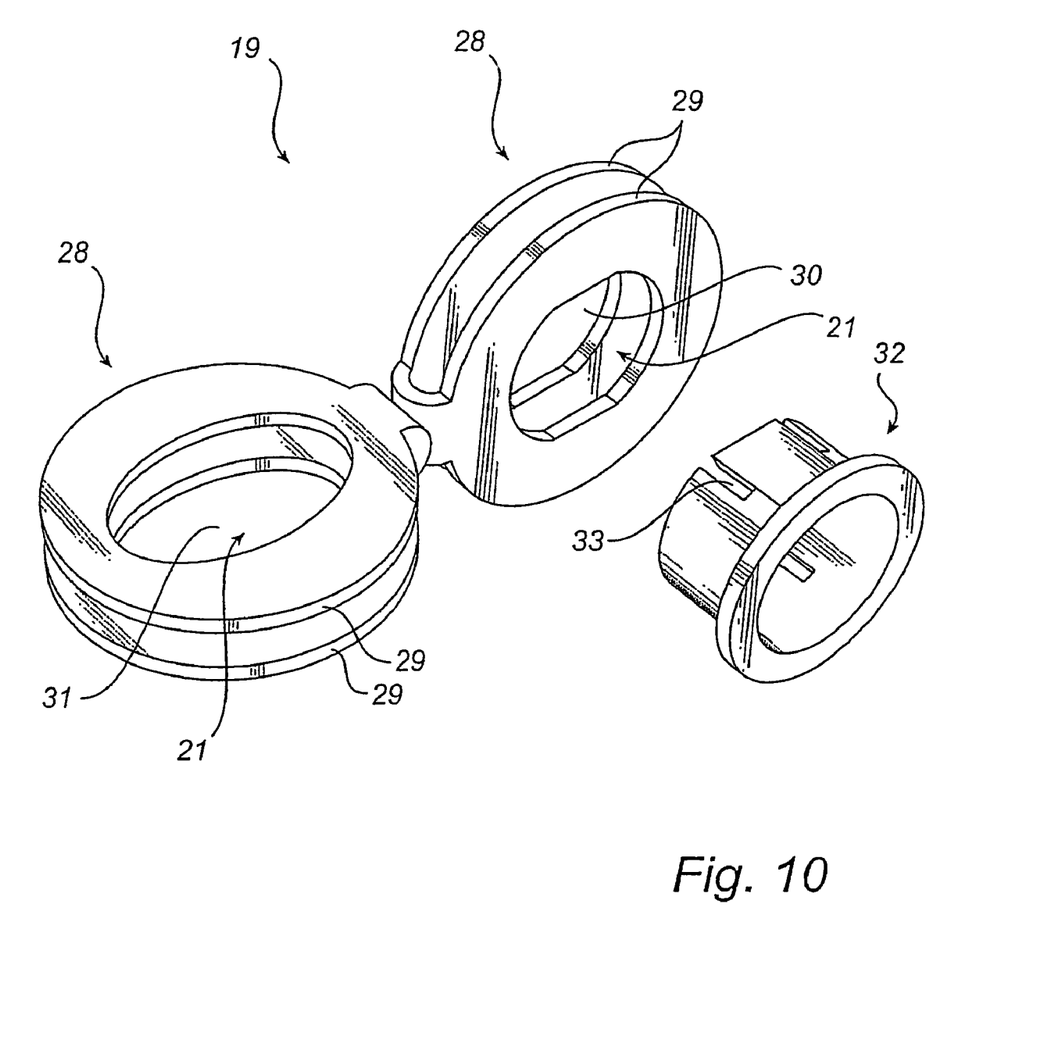
FIG. 10 is a top plan view of another embodiment of a connecting element.

One more embodiment of a connecting element 19 is shown in FIG. 10, to which reference is now made. The embodiment differs from the connecting element 20 shown in FIG. 9 by the two circle segments 28 consisting of two discs 29 which each have a roller means receiving hole 29, which holes are aligned with each other. Furthermore, the embodiment in FIG. 9 differs by the roller means receiving holes 21 in the first circle segment 28 being keyholes 30 and the holes 21 in the second circle segment 28 being elongate holes 31, which elongate hole for the sake of clarity is excessively extended in FIG. 10. In order to connect two successive connecting elements 19, a spacer element 32 can be inserted through the keyhole 30 of the first segment 28 and the elongate hole 31 of the second segment 28. Then the web 18 of a roller means 11, 12 is inserted into the spacer element 32. The spacer element 32 is locked by the keyholes 30.

The spacer element 32 can act resiliently in the longitudinal direction L of the bearing element 9. The resilience is effected by means of slots 33 in the spacer element 32, which extend parallel with the centre axis of the holes 21. The spacer element also prevents the connecting element 19 and the webs 18 of the roller means 11, 12 from coming into contact with each other, i.e. prevents contact of metal with metal.

The elongate hole 31 formed in the second segment 28 causes two roller means 11, 12, which are interconnected by means of the connecting element 19, to be relatively movable in the extent of the elongate hole 31, which corresponds to the longitudinal direction L of the bearing element 9.

It will be appreciated that the present invention is not restricted to the embodiments described above and that a person skilled in the art can modify the above-described supporting installation 1 and the bearing element 9 included therein in various ways.

For instance, it is possible to exclude the above-described chain 15 and let the conveyor belt 2 rest directly on the bearing element 9. It is possible to arrange a chain 15 separately from the bearing element 2 and the associated section 4 for driving the conveyor belt 2.

It will also be appreciated that it is possible to let the chain 15 act as a carrier means 16 only, i.e. the bearing element 9 supports the conveyor belt 2 by way of the chain 15 which is not used to drive the conveyor belt 2.

Nor is it necessary for the bearing element 9, directly or indirectly by way of a chain 15, to act to support a conveyor belt 2 along one side edge 5 thereof. It is thus possible to arrange one or more sections 4 under the conveyor belt 2, at a distance from its side edges 5, and arrange a bearing element 9 along each section 4.

Finally it is also possible to design the bearing element 9 in various ways. It is thus not necessary to alternately arrange a plurality of first and second roller means 11, 12 in succession. It is conceivable to arrange the roller means 11, 12 in groups so that one group comprises, for instance, three roller means of said first type, followed by a group comprising three roller means of said second type. Alternatively, it is possible to let the bearing element 9 comprise two separate means, a first means containing successive roller means of said first type and a second means containing successive roller means of said second type.

Several modifications and variations are thus feasible, which means that the scope of the present invention is exclusively defined by the appended claims.

The invention claimed is:

1. A supporting installation for supporting a number of turns, extending helically one upon the other in a stack, of an at least partly self-supporting conveyor belt, comprising:
   at least one bearing element for supporting the conveyor belt;
   a section for supporting the bearing element, said section being extended in an endless loop along which the bearing element is movable; and
   wherein the at least one bearing element is a roller bearing element comprising a plurality of first and second rollers, wherein neighbouring rollers are interconnected to form a bearing element which is continuously extended in its longitudinal direction.

2. A supporting installation as claimed in claim 1, wherein the first roller has an axis which is oriented in a first direction parallel with a plane made up by two mutually orthogonal axes which are perpendicular to the longitudinal direction of the section.

3. A supporting installation as claimed in claim 1, wherein the second roller has an axis which is oriented in a second direction parallel with a plane made up by two mutually orthogonal axes which are perpendicular to the longitudinal direction of the section.

4. A supporting installation as claimed in claim 1, wherein the first roller is adapted to receive vertical forces.

5. A supporting installation as claimed in claim 1, wherein the second roller is adapted to receive radially directed forces.

6. A supporting installation as claimed in claim 1, wherein the first roller has an axis which is oriented in the transverse direction of the section.

7. A supporting installation as claimed in claim 1, wherein the second roller has an axis which is oriented perpendicular both to the axis of the first roller and to the longitudinal direction of the section.

8. A supporting installation as claimed in claim 1, wherein the first and the second rollers are alternately arranged in the longitudinal direction of the bearing element.

9. A supporting installation as claimed in claim 1, wherein the rollers are spaced from each other.

10. A supporting installation as claimed in claim 1, wherein the interconnected rollers form an endless bearing element.

11. A supporting installation as claimed in claim 1, wherein the diameter of the one of the first and second rollers is greater than the width of the other of the first and second rollers.

12. A supporting installation as claimed in claim 1, wherein the geometric center of the one of the first and second rollers is arranged essentially along the rotational axis of the other of the first and second rollers, as seen perpendicular to a plane made up of two mutually orthogonal axes which are perpendicular to the longitudinal direction of the bearing element.

13. A supporting installation as claimed in claim 1, wherein the rollers of the bearing element are relatively movable in the longitudinal direction of the section.

14. A supporting installation as claimed in claim 13, wherein said rollers are relatively movable under spring action.

15. A supporting installation as claimed in claim 1, comprising at least one drive assembly which is drivable by a motor and adapted to drive the belt.

16. A supporting installation as claimed in claim 15, wherein the drive assembly is a chain.

17. A supporting installation as claimed in claim 1:
further comprising a carrier which is extended along said section and adapted to support the belt; and
wherein said bearing element is arranged between said carrier and said section.

18. A supporting installation as claimed in claim 17, wherein the carrier is formed by drive assembly which is drivable by a motor and adapted to drive the conveyor belt.

19. A supporting installation as claimed in claim 17, wherein the carrier is a chain.

20. A supporting installation as claimed in claim 1:
comprising two chains each extended along the section and adapted to drive and support the belt at a longitudinal side edge of each of the belts; and
wherein the bearing element is in the form of a roller bearing element and is arranged between the associated chain and section.

21. A supporting installation as claimed in claim 1, wherein the section comprises a bearing seat extended along the section and being L shaped in cross section and adapted to receive said bearing element.

22. A bearing element for a supporting installation for supporting a number of turns, extending helically one upon the other in a stack, of an at least partially self-supporting conveyor belt, comprising:
a plurality of first rollers and a plurality of second rollers;
said first and second rollers being alternately arranged in succession to form an elongate bearing element;
the rotational axes of the first and second rollers being mutually orthogonal and also perpendicular to the longitudinal direction of the bearing element; and
two neighboring rollers being interconnected by a connecting element, said connecting element holding the neighbouring rollers spaced apart from each other.

23. A bearing element as claimed in claim 22, wherein said relative mobility is provided by elongate holes formed in the respective connecting elements and extending in the longitudinal direction of the bearing element and encompassing a web of one of two neighboring rollers.

24. A bearing element as claimed in claim 22, wherein each connecting element is arranged so as to allow mutual resilience of the rollers.

25. A bearing element as claimed in claim 22, wherein the diameter of one of the first and second rollers is greater than the width of the other of the first and second rollers.

26. A bearing element as claimed in claim 22, wherein each roller comprises a web.

27. A bearing element as claimed in claim 22, wherein said connecting element comprises a generally U shaped piece with a hole formed in each leg of the U shaped piece, which holes are aligned with each other, the web of the U shaped piece grasping a web of one of the first and the second rollers and said holes receiving a web of the other of the first and the second rollers.

28. A bearing element as claimed in claim 27, wherein a resilient lip is arranged on the edge of the hole in one of the legs of the U shaped piece, said lip being extended towards the hole in the other of the legs of the U shaped piece.

29. A bearing element as claimed in claim 22, wherein the connecting element allows relative mobility between the rollers in the longitudinally direction of the bearing element.

* * * * *

UNITED STATES PATENT AND TRADEMARK OFFICE
CERTIFICATE OF CORRECTION

PATENT NO. : 7,374,035 B2
APPLICATION NO. : 10/535721
DATED : May 20, 2008
INVENTOR(S) : L. Olsson et al.

It is certified that error appears in the above-identified patent and that said Letters Patent is hereby corrected as shown below:

| COLUMN | LINE | ERROR |
|---|---|---|
| Title Page Item (30) Pg. 1, Col. 1 | Foreign Appln. Priority Data | "0203419" should read --0203419.7-- |
| 10 (Claim 9, line 2) | 47 | "spaced from" should read --spaced apart from-- |
| 11 (Claim 18, line 2) | 12 | "by drive" should read --by a drive-- |
| 12 (Claim 29, line 3) | 34 | "longitudinally" should read --longitudinal-- |

Signed and Sealed this

Thirtieth Day of December, 2008

JON W. DUDAS
*Director of the United States Patent and Trademark Office*